US009003596B2

(12) United States Patent
Avasiloaie et al.

(10) Patent No.: US 9,003,596 B2
(45) Date of Patent: Apr. 14, 2015

(54) UNIVERSAL COUPLER FOR A BEAM BLADE WINDSHIELD WIPER ASSEMBLY

(75) Inventors: Valentin Avasiloaie, Dearborn Heights, MI (US); Dan Ehde, Ortonville, MI (US)

(73) Assignee: Trico Products Corporation, Rochester Hills, MI (US)

( * ) Notice: Subject to any disclaimer, the term of this patent is extended or adjusted under 35 U.S.C. 154(b) by 803 days.

(21) Appl. No.: 13/232,627

(22) Filed: Sep. 14, 2011

(65) Prior Publication Data

US 2012/0060315 A1 Mar. 15, 2012

Related U.S. Application Data

(60) Provisional application No. 61/383,124, filed on Sep. 15, 2010.

(51) Int. Cl.
*B60S 1/38* (2006.01)
*B60S 1/40* (2006.01)

(52) U.S. Cl.
CPC ............... *B60S 1/381* (2013.01); *B60S 1/3849* (2013.01); *B60S 1/3863* (2013.01); *B60S 1/3889* (2013.01); *B60S 1/4019* (2013.01); *B60S 2001/4032* (2013.01)

(58) Field of Classification Search
USPC ............. 15/250.32, 250.43, 250.44, 250.361, 15/250.201
See application file for complete search history.

(56) References Cited

U.S. PATENT DOCUMENTS

| 5,611,103 | A | 3/1997 | Lee |
| 5,618,124 | A | 4/1997 | Chen |
| 7,523,522 | B2 | 4/2009 | Herring et al. |
| 8,261,403 | B2 * | 9/2012 | Ehde ........................ 15/250.32 |
| 2005/0028312 | A1 * | 2/2005 | Coughlin ................ 15/250.32 |
| 2009/0199357 | A1 | 8/2009 | Thienard |

FOREIGN PATENT DOCUMENTS

CN 101087708 A 12/2007
JP 2007-276724 A 10/2007

OTHER PUBLICATIONS

May 2, 2012 International Search Report and Written Opinion for PCT/US2011/051564.
Nov. 4, 2014 Chinese Office Action for Chinese Application No. 201180044753.7.

* cited by examiner

*Primary Examiner* — Gary Graham
(74) *Attorney, Agent, or Firm* — Howard & Howard Attorneys PLLC

(57) ABSTRACT

The present invention overcomes the limitations and disadvantages in the related art in a beam blade windshield wiper assembly having a universal coupler assembly. The universal coupler assembly includes a carrier that is operatively mounted to the windshield wiper assembly, a saddle that is removably received and retained by the carrier, and a coupler that is operatively mounted to the saddle. The carrier, saddle, and coupler cooperate to accommodate various sizes of "hook-type" attachment members, "bayonet-type" attachment members, as well as "pin-type" attachment members that are used to connect the wiper arm and the windshield wiper assembly.

26 Claims, 10 Drawing Sheets

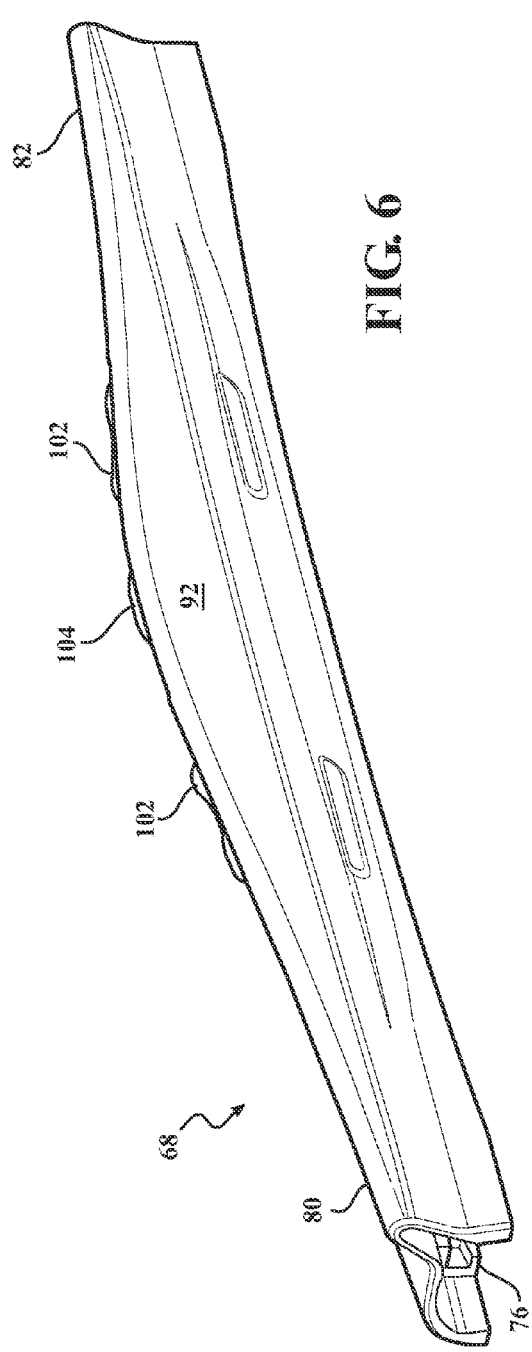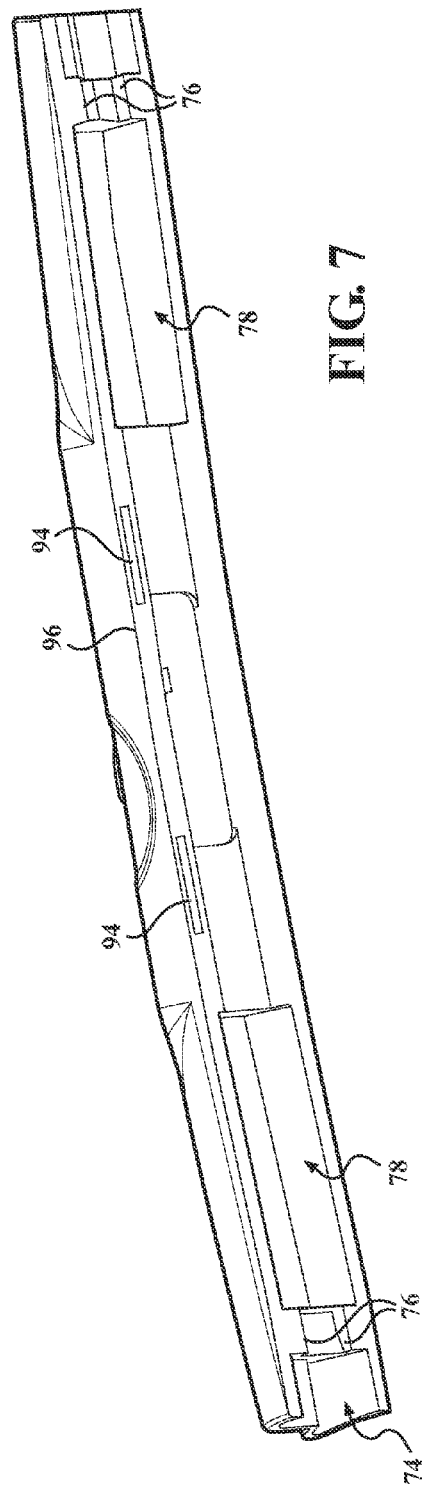

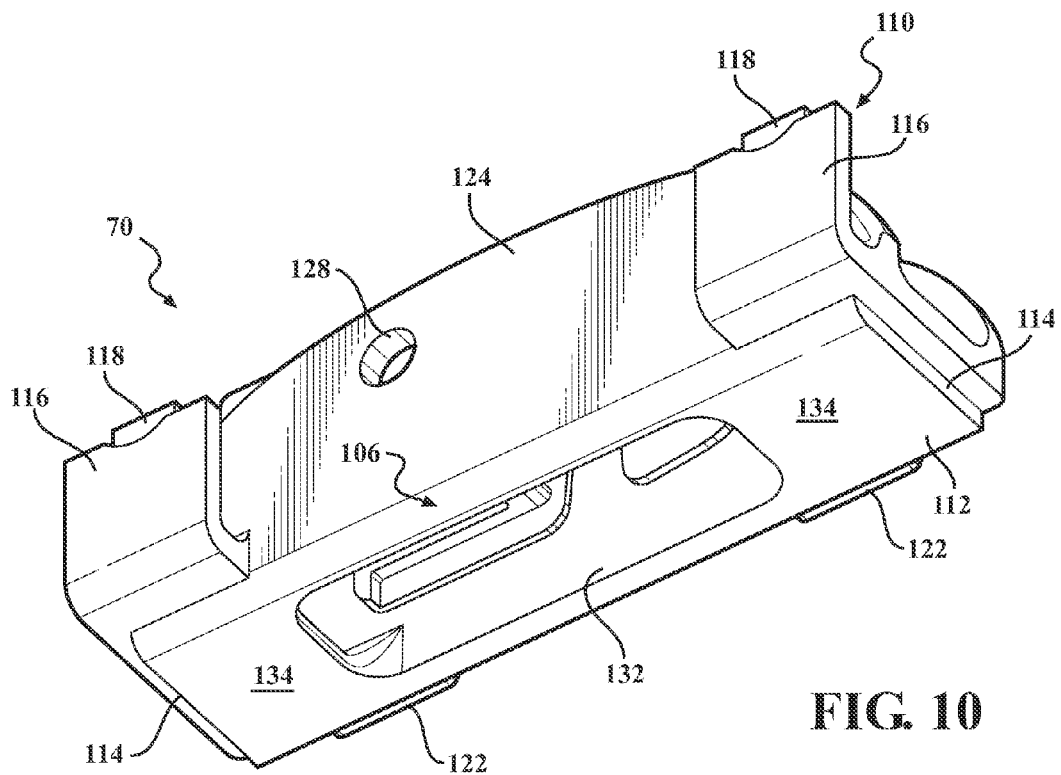
FIG. 10
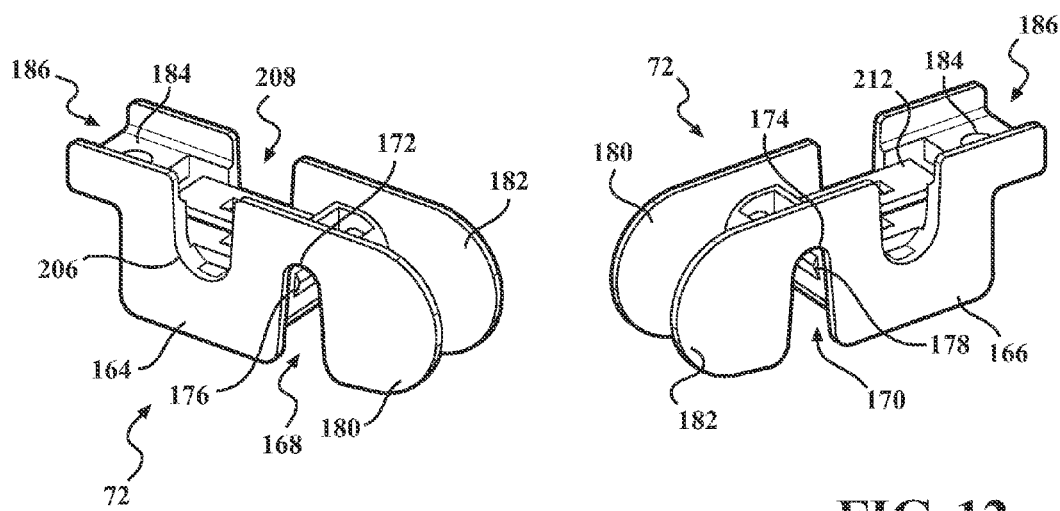
FIG. 11
FIG. 12

UNIVERSAL COUPLER FOR A BEAM BLADE WINDSHIELD WIPER ASSEMBLY

CROSS REFERENCE TO RELATED APPLICATIONS

This application claims the benefit of U.S. provisional patent application entitled "Universal Coupler for a Beam Blade Windshield Wiper Assembly," having Ser. No. 61/383,124, and filed on Sep. 15, 2010.

BACKGROUND OF THE INVENTION

1. Field of the Invention

The present invention relates, generally, to windshield wiper assemblies. More specifically, the present invention relates to a universal coupler for a beam blade windshield wiper assembly used in connecting the beam blade wiper to various styles of wiper arms.

2. Description of the Related Art

Windshield wipers known in the related art include two categories commonly referred to as, "tournament" wipers and "beam blade" style wipers. In either category, the windshield wiper assembly is removably connected to the wiper arm of a vehicle. Specifically, a wiper coupler is employed to facilitate the connection between the windshield wiper assembly and the attachment member of the wiper arm.

At the manufacturing level, there is usually not much concern over compatibility between the wiper assemblies and the wiper arm since these components are typically supplied to OEM vehicle manufacturers as a part of an overall wiper system. However, windshield wiper assemblies wear out and must be replaced. Typically, the wiper coupler for a beam blade windshield wiper assembly is designed solely for use in connection with a single style of wiper arm attachment member. In the aftermarket, compatibility between the wiper arm and windshield wiper assembly is a problem. End users are provided with few, if any, options for replacement wiper assemblies and are often required to purchase replacement wiper assemblies from dealerships for the OEM vehicle manufacturer.

As a result of the limited aftermarket availability and limited options associated with beam blade windshield wipers, there is a need in the art for a universal coupler assembly for use with a beam blade windshield wiper assembly that operatively couples a beam blade windshield wiper to several different wiper arm attachment members.

SUMMARY OF THE INVENTION

The present invention overcomes the limitations and disadvantages in the related art in a beam blade windshield wiper assembly having a universal coupler assembly. The windshield wiper assembly includes a wiping element that contacts the surface to be wiped, at least one elongated beam having a pair of longitudinal ends, and a coupler assembly. The coupler assembly includes a carrier that is mounted to the elongated beam between its longitudinal ends. A saddle is removably received and retained by the carrier. The coupler assembly also includes a coupler that is adapted to be mounted to the saddle. The coupler includes a pair of sidewalls, each having a notch aligned with respect to each other and a land extending between sidewalls cooperating to define a channel therebetween. A cantilevered beam extends between the sidewalls in spaced parallel relation to the land. The cantilevered beam includes a super-surface cooperating with the sidewalls to define an elongate passage. The channel and elongate passage cooperate to operatively receive a first hook-type wiper arm attachment member of at least two different sizes. The cantilevered beam further includes a sub-surface that cooperates with the sidewalls to define an elongate track. The channel and the elongate track cooperate to operatively receive a second hook-type wiper arm attachment member of at least three different sizes. In addition, a substrate extends between the side walls in parallel relation to and disposed between the land and the cantilevered beam. The substrate cooperates with the land and the notches to receive at least two different diameter pin-type wiper arm attachment members and further cooperates with the sidewalls and the land to define an elongate cavity adapted to operatively receive at least one size bayonet-type wiper arm attachment member.

In another embodiment, the present invention is directed toward a beam blade windshield wiper assembly having a universal coupler assembly. The windshield wiper assembly includes a wiping element that contacts the surface to be wiped, at least one elongated beam having a pair of longitudinal ends, and a coupler assembly. The coupler assembly includes a carrier that is mounted to the elongated beam between its longitudinal ends. The carrier includes a top surface and a seat formed on the top surface of the carrier. A saddle is removably received and retained in the seat of the carrier. The saddle includes a body, a coupler mount, and a locking mechanism for releasably engaging the carrier. The body is adapted to be cooperatively received in the seat formed by the carrier. In addition, the coupler assembly includes a coupler having a pair of sidewalls, each with a nock aligned with respect to one another such that the coupler is adapted to be mounted to the saddle. The carrier, coupler, and saddle cooperate to accommodate at least five different sizes of hook-type attachment members, two different sizes of pin-type attachment members, and at least one size of bayonet-type attachment members.

Thus, one advantage of the present invention is that the beam blade wiper assembly operatively engages a wiper arm attachment member that was typically, exclusively used in connection with tournament-style wiper blade assemblies.

Another advantage of the present invention is that the universal wiper coupler assembly provides a beam blade windshield wiper assembly as a replacement option to tournament-style windshield wiper blade assemblies, thereby increasing the options of available replacement windshield wiper assemblies to the end users.

Still another advantage of the present invention is that it provides a beam blade windshield wiper assembly that is adapted to releasably engage several different wiper arm attachment members, thereby reducing the need for several different windshield wiper assemblies at the OEM level.

Yet another advantage of the present invention is that it provides a beam blade windshield wiper assembly that is adapted for use in connection with several different wiper arm attachment members, thereby increasing the availability of beam blade windshield wiper assemblies in the aftermarket.

Other objects, features and advantages of the present invention will be readily appreciated as the same becomes better understood after reading the subsequent description taken in connection with the accompanying drawings.

BRIEF DESCRIPTION OF THE DRAWINGS

FIG. 6 is a rear perspective view of the carrier of the coupler assembly;

FIG. 7 is a bottom perspective view of the carrier of the coupler assembly;

FIG. 10 is a bottom perspective view of the saddle of the coupler assembly;

FIG. 11 is a side perspective view of the coupler of the coupler assembly;

FIG. 12 is an opposite side perspective view of the coupler of the coupler assembly;

DETAILED DESCRIPTION OF THE PREFERRED EMBODIMENT(S)

Figure 1:
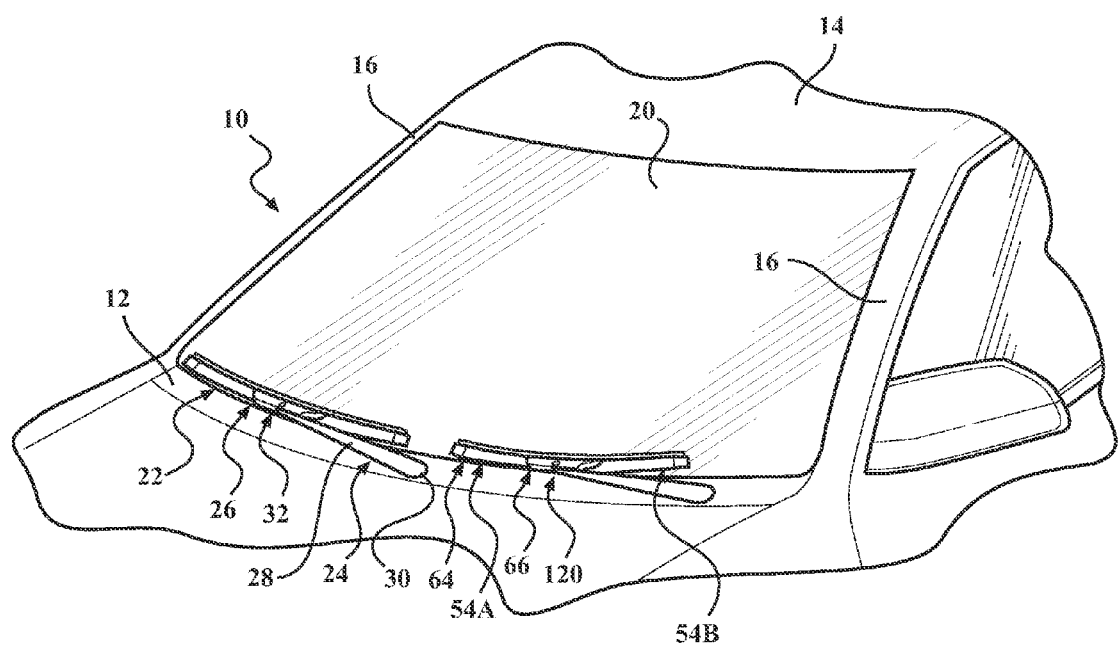
FIG. 1 is a partial perspective view of the front of an automotive vehicle having a pair of windshield wiper assemblies that are pivotally mounted for reciprocal movement across the windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to support a curved or "swept back" glass windshield 20 located therebetween.

A wiper system is generally indicated at 22 in FIG. 1 and is employed to clean the glass windshield 20. The wiper system 22 includes a wiper arm, generally indicated at 24 and a beam blade windshield wiper assembly of the present invention, generally indicated at 26, (hereinafter referred to as a "wiper assembly"). The wiper assembly 26 is releasably engaged to the wiper arm 24 and adapted to clean the surface to be wiped, namely a windshield 20. Those having ordinary skill in the art will appreciate that a wiper system 22 may include more than one wiper arm 24 and wiper assembly 26. By way of example and as indicated in FIG. 1, a wiper system 22 may include a pair of wiper arms 24 and wiper assemblies 26, which correspond to the driver and passenger side of the vehicle 10.

Furthermore, those having ordinary skill in the art will appreciate that wiper assemblies 26 may be employed in other areas of a vehicle 10, such as a rear window (not shown) or a head lamp (not shown) that employs a wiper system 20. Thus, it will be understood that the present invention is not limited for use solely in connection with wiper arms 24 adjacent to a vehicle's windshield 20, but for use in all applications where wiper assemblies 26 are employed.

The wiper arm 24 includes an elongate body 28 having a pivot end 30 that is operatively engaged to a motor (not shown) that drives the wiper arm 24 in an oscillating manner across the windshield 20. More specifically, the elongate body 28 is operatively attached to the pivot end 30 in a hinged manner to enable a person to elevate the elongate body 28 away from the windshield 20. Articulation between the pivot end 30 and elongate body 28 in this manner is conventionally known to enable maintenance or inspection of the wiper system 22 and/or windshield 18 as well as for removal and installation of wiper assemblies 26. Those having ordinary skill in the art will appreciate that the wiper arm 24 may further include a biasing member to impart a downward force through the wiper arm 24 and onto the wiper assembly 26 to facilitate contact between the wiper assembly 26 and the windshield 20 of the vehicle 10. By way of example, the biasing member may include a spring. It should further be appreciated that the elongate body 28 of the wiper arm 24 may include a cavity adjacent to the pivot end 30 to operatively receive the biasing member.

As noted above, windshield wiper systems may employ wiper arms having different styles of attachment members. For example, FIGS. 1, 14A-15B, show a wiper arm 24 having an attachment member, generally indicated at 32, that extends from the elongate body 28. FIGS. 14A, 14B and 15A, 15B show two different representative sizes of "hook-type" attachment member 32A and 32B, respectively. The hook-type attachment members shown in these figures are representative of standard types of attachment arms commonly known in the art. Those having ordinary skill in the art will further appreciate that the hook-type attachment members are manufactured having different sizes. For example, it is known to employ hook-type attachment members for metric applications having sizes ranging from 7 mm; 9×3; 9×4×23; 9×4×28; and 9×4×33 mm. In addition, the coupler assembly of the present invention is also adapted to be used with "bayonet-type" attachment members and "pin-type" attachment members of various sizes. Pin-type, bayonet-type and hook-type attachment members of various sizes have been traditionally employed exclusively for connection to a "tournament" style windshield wiper assembly. However, the present invention provides a universal coupler that enables a beam blade windshield wiper assembly 26 as a replacement option for use in connection with wiper arm attachment members that traditionally connect to tournament style windshield wiper assemblies.

Figure 2:
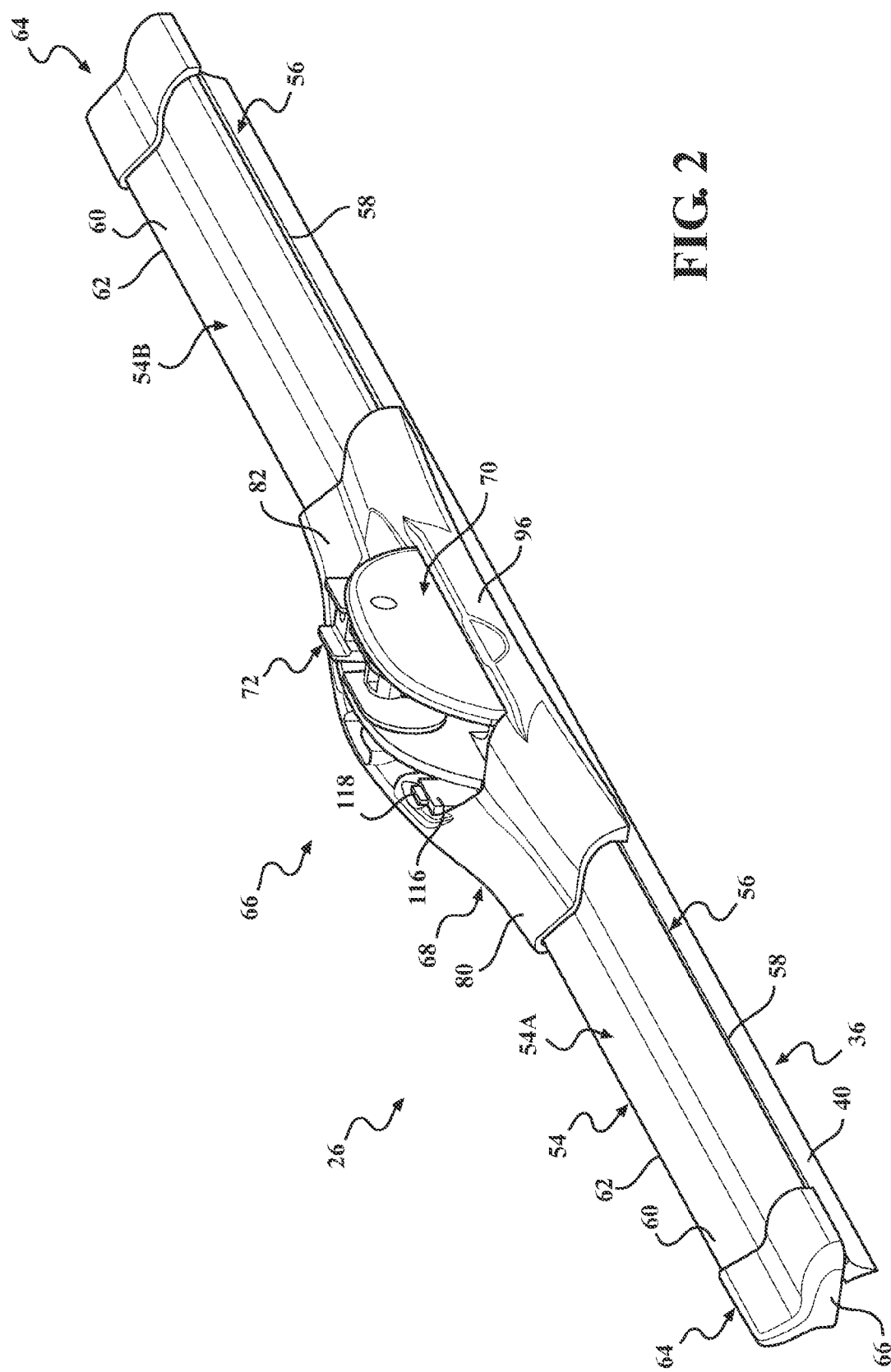
FIG. 2 is a perspective view of a windshield wiper assembly.
Figure 3:
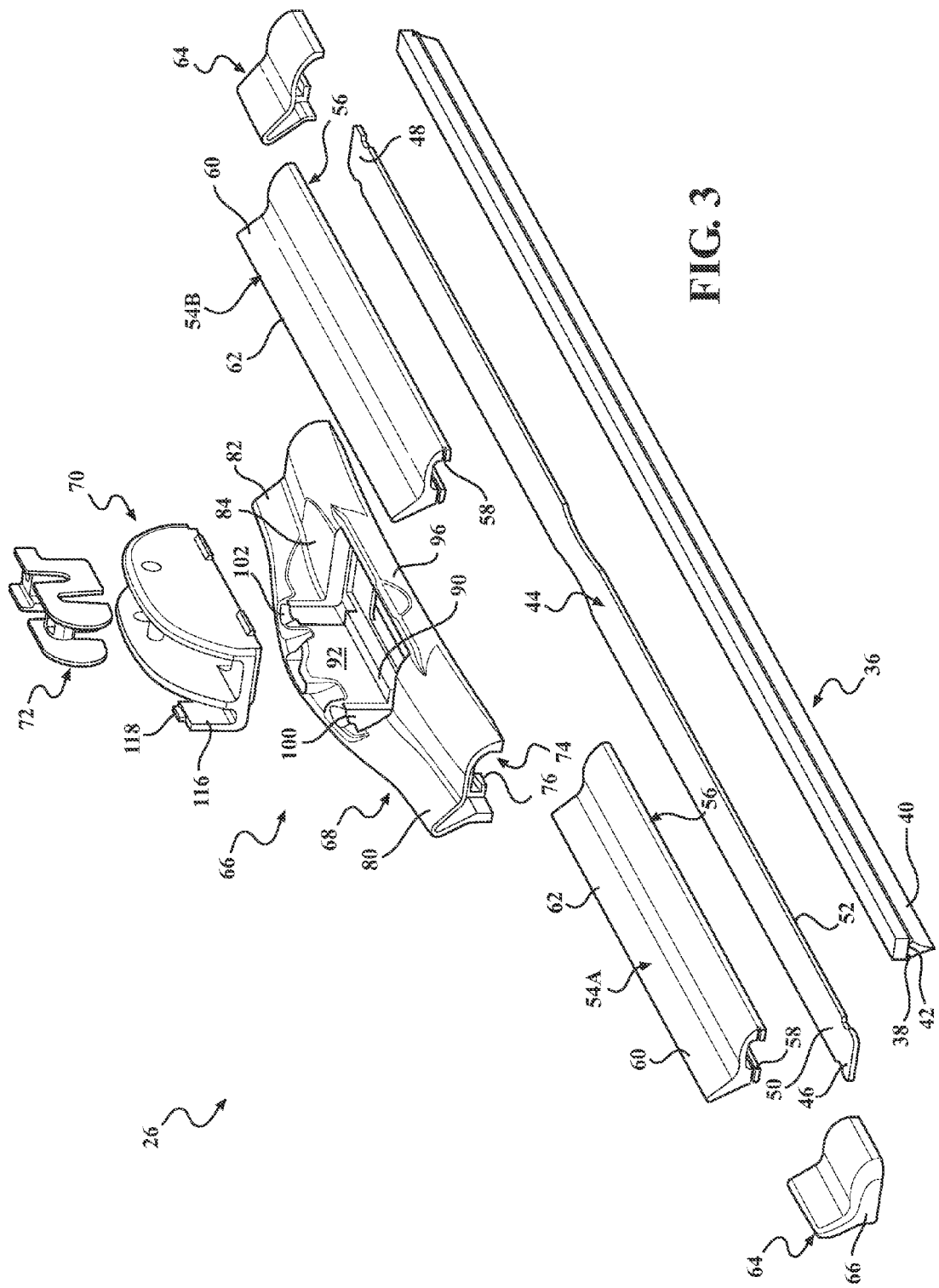
FIG. 3 is an exploded view of the windshield wiper assembly.
Figure 4:
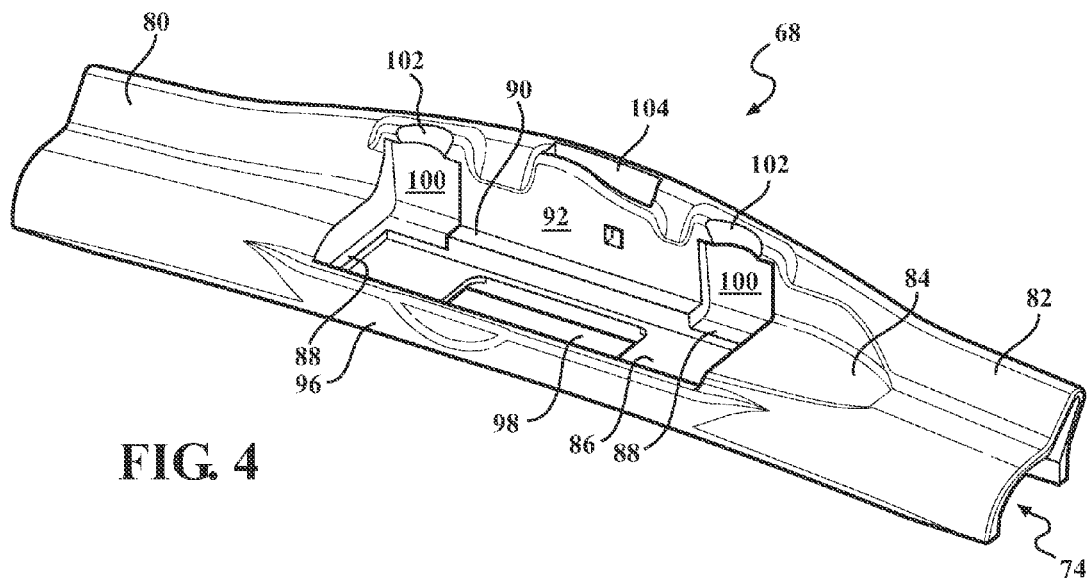
FIG. 4 is a front perspective view of the carrier of the coupler assembly.
Figure 5:
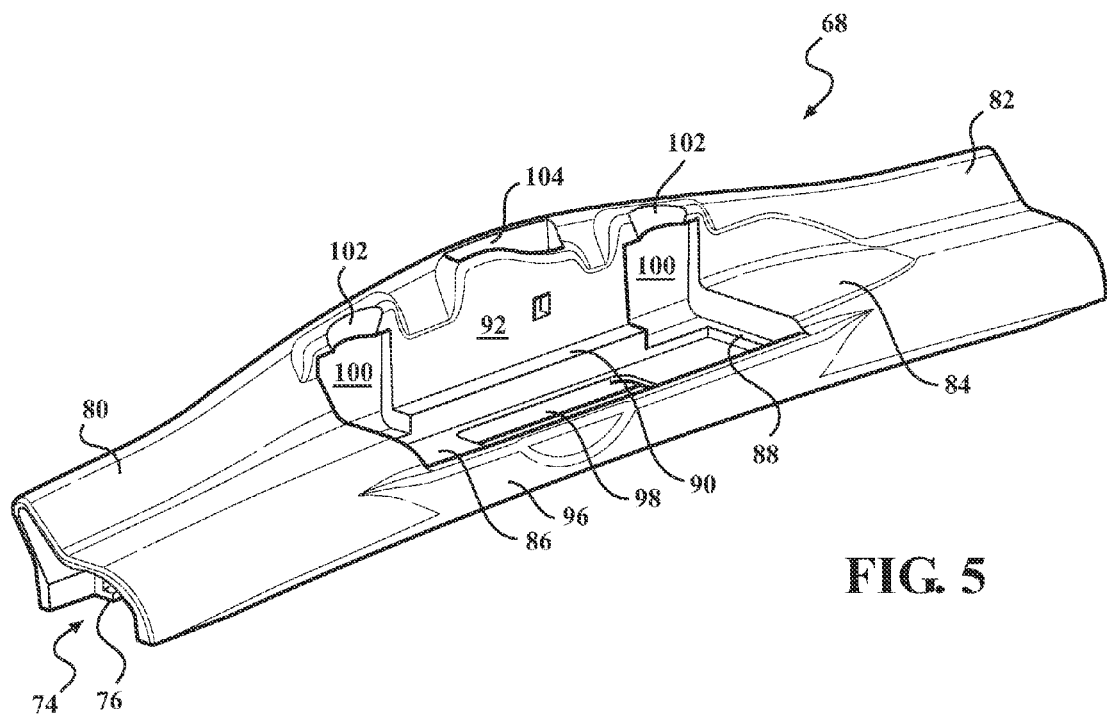
FIG. 5 is another front perspective view of the carrier of the coupler assembly.

Referring to FIGS. 1-3, the wiper assembly 26 includes a wiping element, generally indicated at 36, that is adapted to contact the surface of the vehicle 10 to be wiped, in this representative example, the windshield 20. The wiping element 36 includes an upper section 38 and a lower section 40 that are segmented by a longitudinally extending partition 42. The partition 42 provides flexibility between the upper section 38 and lower section 40 during operational movement of the wiper assembly 24. The upper section 38 is adapted to facilitate attachment to additional components of the wiper assembly 26, as described in greater detail below, while the lower section 40 is adapted to engage the surface to be wiped.

The wiping element 36 includes a predetermined length and cross-sectional profile corresponding to a particular application and is typically manufactured through an extrusion process, which enables the length and cross-sectional profile of the wiping element 36 to be easily adjusted without a substantial increase to manufacturing expense. Furthermore, while the wiping element 36 of the present invention is constructed from a flexible rubber. Those having ordinary skill in the art will appreciate that the wiping element 36 may be constructed from any flexible material, such as silicone or other polymer, and via any manufacturing process, such as injecting molding, without departing from the scope of the invention.

The wiper assembly 26 may also include an elongated beam, generally indicated at 44, that operatively engages the wiping element 36. The elongated beam 44 is adapted to distribute downward pressure from the wiper arm 24 across the wiping element 36. As a result, the elongated beam 44 includes longitudinal ends 46 and 48 that define a predetermined length capable of facilitating distribution of the downward pressure from the wiper arm assembly 24. The elongated beam 44 further includes a top end 50 and a bottom end 52 disposed between the longitudinal ends 46 and 48. In the embodiment illustrated in the figures, the wiping element 36 is operatively engaged to the bottom end 52 of the elongated beam 44 by an adhesive/epoxy. However, those having ordinary skill in the art will appreciate that the elongated beam 44 may be operatively engaged to the wiping element 36 by other methods such as through a slot defined within the elongated beam 44 that receives a portion of the wiping element 36. Furthermore, those having ordinary skill in the art will appreciate that the wiper assembly 26 may include more than one elongated beam 44 that is operatively engaged to the wiping element 36.

The elongated beam 44 may be constructed from any resiliently flexible material, such as spring steel or a polymer, that facilitates the application of force from the spring-loaded wiper arm 24 across the span of the elongated beam 44 toward the first and second longitudinal ends 46 and 48. To that end, the elongated beam 44 may be curved longitudinally with a predetermined radius of curvature that is the same as or greater than the plane of curvature of the windshield 20. This predetermined radius of curvature is sometimes referred to in the related art as a "free form" radius of curvature (hereinafter "windshield curvature"). Accordingly, the curvature of the elongated beam 44 may be symmetrical or asymmetrical depending on the force requirements and the contour of the windshield 20. The flexible, free form, pre-curved elongated beam 44 straightens out when the wiper arm 24 applies a force thereto to flatten the elongated beam 44 and direct the wiping element 36 to contact the windshield 20. Thus, the elongated beam 44 includes a free-form curvature that ensures force distribution on windshields having various curvatures that effects proper wrapping about the windshield 20.

The elongated beam 44 includes a substantially constant thickness and may have a constant width throughout the length between the first and second longitudinal ends 46 and 48. The constant thickness is adapted to provide high lateral and torsional stiffness to avoid lateral and torsional deflection, which causes the wiping element 36 to stick/slip ("chatter") on the windshield 20 during operation. Thus, the cross-section of the elongated beam 44 is substantially uniform, which makes it easier to manufacture. More specifically, where the elongated beam 44 is constructed from metal, such as spring steel, the tools and machinery used to manufacture the elongated beam 44 are less complicated than that required to manufacture a beam 44 having a varying thickness. Furthermore, where the elongated beam 44 is constructed from a polymer, such as a thermoplastic elastomer, the tools and extrusion process machinery are also less complicated than those employed to manufacture an elongated beam having a varying thickness. However, those having ordinary skill in the art will appreciate that the elongated beam 44 illustrated herein may include a varying thickness and/or outer profile (width) without departing from the scope of the invention. By way of example, the width and/or thickness of the elongated beam 44 may taper linearly from the beam center, sinusoidally, parabolically, or asymmetrically. Additionally, the elongated beam 44 illustrated throughout the figures is a single, integral piece of material such that it defines a solid cross-section. However, those having ordinary skill in the art will appreciate that the elongated beam 44 may be formed into a single piece or multiple pieces using a plurality of laminates.

The wiper assembly 26 may also include an airfoil, generally indicated at 54 that acts to reduce the likelihood of wind lift during operational movement across the surface to be wiped. The airfoil 44 includes two segments 54A and 54B that include identical structure. Accordingly, the same reference numerals will be used to describe the structure of the two segments 54A and 54B of the airfoil 54. However, those having ordinary skill in the art will appreciate that the airfoil 54 may also be constructed as a single unit.

The airfoil 54 includes a base, generally indicated at 56. The base 56 includes an attachment portion 58 that engages the elongated beam 44. More specifically, the attachment portion 58 of each of the segments 54A and 54B engage a portion of the top end 50 and bottom end 52 between the longitudinal ends 46 and 48, thereby joining the airfoil 54, wiping element 36 and elongated beam 44 together. Those having ordinary skill in the art will appreciate that the airfoil 54, elongated beam 44 and wiping element 36 may be joined together through other means such as bonding the airfoil 54 to the top end 50 of the elongated beam 44 via adhesive/epoxy or by employing additional structure such as a retainer or spline that couples the wiping element 36 to the elongated beam 44 or the elongated beam 44 to the airfoil 54 without departing from the scope of the invention.

The airfoil 54 further includes a spoiler 60 that is adapted to utilize airflow to increase downward force on to the wiper assembly 26 during operational movement across the surface to be wiped. To this end, the spoiler 60 tapers inwardly from the base 56 toward a terminal point 62 to define a profile that is slightly contoured. As shown in FIGS. 2 and 3, the profile of the spoiler 60 is substantially symmetrical in cross-section. However, those having ordinary skill in the art will appreciate that the spoiler 60 may include an asymmetrical cross-sectional profile without departing from the scope of the invention. Additionally, those having ordinary skill in the art will appreciate that the airfoil 54 may include a solid-core spoiler 60 or a hollow-core spoiler 60 without departing from the scope of the invention. The airfoils 54A and 54B of the present invention are manufactured from a thermoplastic material and using a manufacturing process that may be the same as described above relative to the wiping element 36. However, it should be appreciated that the airfoils 54 may be manufactured using a different process and/or different material. By way of example, the airfoils 54 may be manufactured via an injection molding process using a polymer composition having greater hydrophobic properties than the materials used for manufacturing the wiping element 36.

The wiper assembly 26 may also include a pair of end caps, generally indicated at 64. The end caps 64 are adapted to operatively engage the airfoil 54. The end caps 64 include a profile that substantially mimics the contours of the airfoil 54 to maintain the wind lift characteristics of the wiper assembly 26 and to provide an increased aesthetic value. The end caps 64 include a closed end 66 that covers the longitudinal ends 46 and 48 of the elongated beam 44. The closed end 66 prevents infiltration of water, ice, and debris between the elongated beam 44 and the airfoil 54, which may prevent proper operation of the wiper assembly 26. The closed end 66 of the end caps 64 may be adapted to extend beyond the longitudinal ends 46 and 48 of the elongated beam 44 to facilitate contact between the outer extremities of the wiping element 26 and the surface to be wiped. More specifically, the end caps 64 provide a mass increase adjacent to the longitudinal ends 46 and 48 of the elongated beam 44 that reduce the likelihood of localized chatter along the extremities of the wiping element 26 caused by the combination of wind lift and a decrease in the force distributed to this area from wiper arm 24 via the elongated beam 44, as described above.

The wiper assembly 26 further includes a universal coupler assembly, generally indicated at 66. The universal coupler assembly 66 may be employed to accommodate wiper arms having attachment members of various sizes including, but not limited to, two different pin-style attachment members, at least one bayonet-style attachment member and up to five different hook-type attachment members. The coupler assembly 66 includes a carrier, generally indicated at 68, a saddle, generally indicated at 70, and a coupler, generally indicated at 72. Each of these components will be described in greater detail below. More specifically, the carrier 68 is disposed along an intermediate position between the first and second airfoils 54A and 54B. Contrary to conventional beam blade-style wiper assemblies, which include a small contact point through which force from the wiper arm 24 is distributed, the carrier 68 broadens the initial point through which force is applied from the wiper arm 24 to the elongated beam 44. In this manner, the downward force from the wiper arm 24 is distributed with more efficiency across the elongated beam 44, thereby reducing the likelihood of wind lift and improving wiping action.

Referring to FIGS. 4-7, the carrier 68 includes an interior surface 74 that is disposed in proximate relation to the elongated beam 44. The interior surface 74 includes a plurality of transversely extending tangs 76 that are adapted to operatively engage the bottom end 52 of the elongated beam 44. The tangs 76 cooperate with the remaining structure of the interior surface 74 to define a track, generally indicated at 78, that operatively receives an intermediate portion of the elongated beam 44. As shown in FIG. 7, the interior surface 74 includes four transversely extending tangs 76 operatively disposed adjacent to the airfoil segments 54A and 54B to accommodate the resiliency of the elongated beam 44. In this manner, a portion of the elongated beam 44 is retained within the track 78, but remains able to flex in response to the curvature of the surface to be wiped.

It should be appreciated that the airfoil segments 54A and 54B restrict the axial movement of the carrier 68 relative to the elongated beam 44. However, those having ordinary skill in the art will appreciate that the tangs 76 may include additional structure to prevent axial movement between the carrier 68 and the elongated beam 44. By way of example, one or more of the tangs 76 may further include a post and the elongated beam 44 may include a corresponding detent that is adapted to receive the post to prevent such axial movement of the carrier 68 relative to the elongated beam 44. Those having ordinary skill in the art will appreciate that the elongated beam 44 may be operatively attached to the carrier 68 by several methods other than as described above. By way of example, the carrier 68 may be fixed by adhesive, riveted or welded to the elongated beam 44.

The carrier 68 further includes a first end, generally indicated at 80, that is disposed adjacent to one of the airfoil segments 54A and a second end, generally indicated at 82, that is disposed adjacent to the other airfoil segment 54B. The first and second ends 80, 82 each include a contoured exterior surface that substantially corresponds to the contoured profile of the airfoil segments 54A and 54B. The second end 82 includes a relief surface 84 that tapers downwardly toward one of the airfoil segments 54B. The relief surface 84 is essentially a depression that provides clearance for various attachment members that are serviced by the coupler assembly 66, as will be described in greater detail below.

The carrier 68 includes a seat 86 that is essentially a depression formed in the top surface of the carrier 68. The seat 86 is bordered on at least three sides by a shelf 88. A ledge 90 extends between two portions of the shelf 88 along the back wall 92 of the carrier 68 that extends between the first and second ends 80, 82 of the carrier 68. A pair of apertures 94 are formed in the front, lower wall 96 of the carrier 68 opposite the back wall 92. The seat 86, shelf 88, and apertures 94 are employed to located and fix the saddle 70 relative to the carrier 68 as will be described in greater detail below. The seat 86 may also include a window 98 to provide clearance for structural components of the various types of attachment members formed on the wiper arm, as the case may be.

The higher back wall 92 includes a pair of pockets 100 disposed spaced from one another. The pockets 100 are designed to cooperate with a locking mechanism formed on the saddle 70 as will be described in greater detail below. Each pocket 100 merges into a release clearance 102 formed at the upper end of the pockets 100. The release clearance 102 allow the user to removably attach/detach the saddle 70 to the carrier 68, as will be described in greater detail below. In addition, the back wall 92 may also include a contoured depression 104 disposed between the pair of pockets 100.

Figure 8:
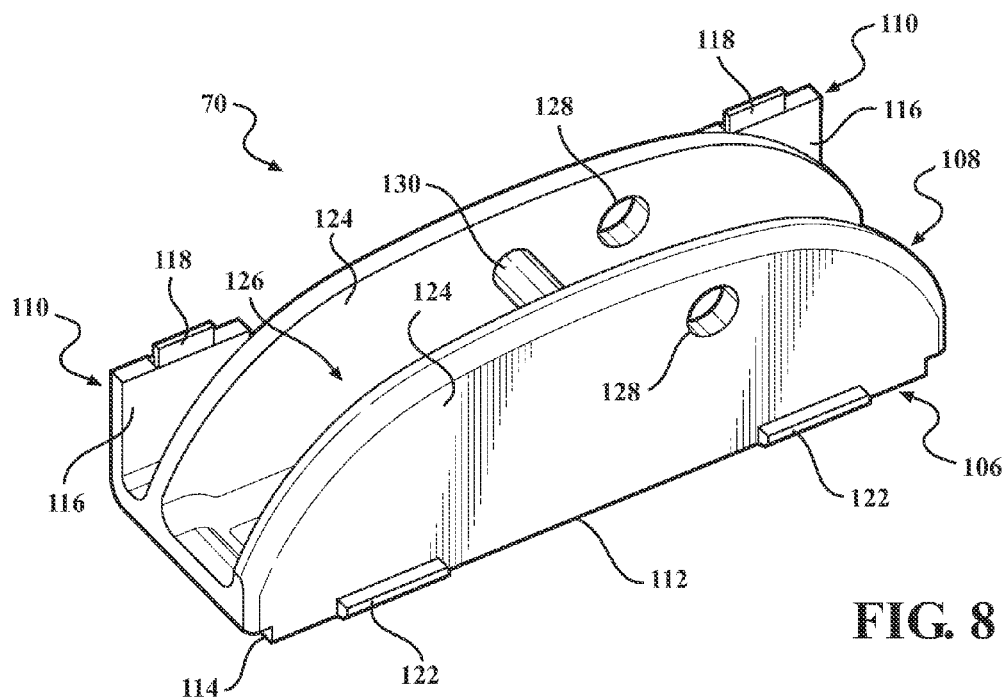
FIG. 8 is a front perspective view of the saddle of the coupler assembly.
Figure 9:
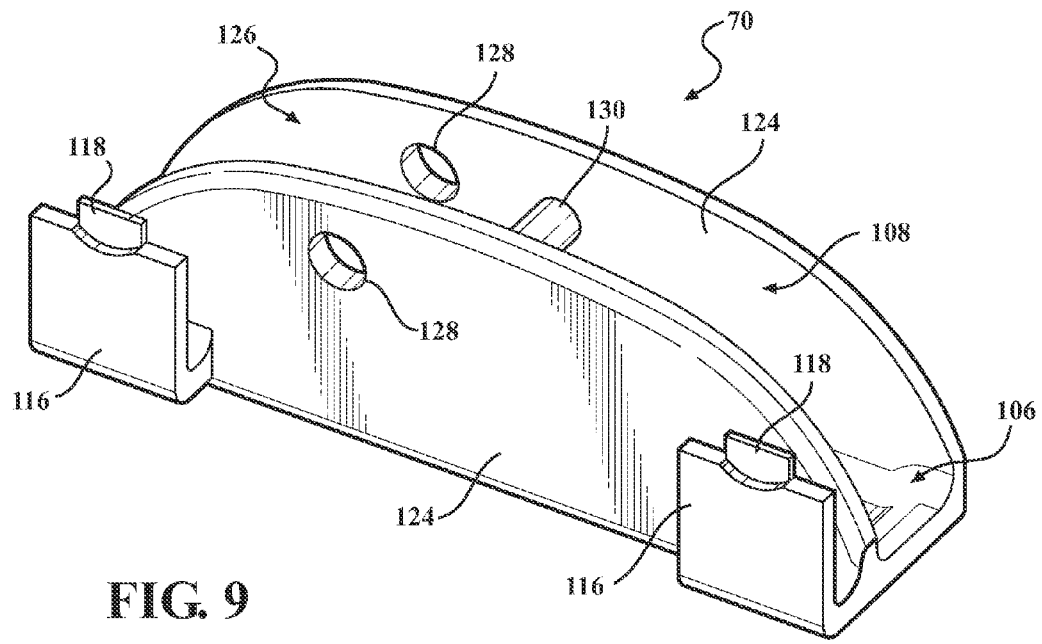
FIG. 9 is a rear perspective view of the saddle of the coupler assembly.

The saddle 70 is best shown in FIGS. 8-10 and includes a body 106, a coupler mount 108, and a locking mechanism 110. The body 106 is adapted to be cooperatively received in the seat 86 formed by the carrier 68. To this end, the bottom wall 112 of the saddle 70 includes a pair of parallel spaced shoulders 114 that are adapted to cooperatively mate with the shelf 88 that borders the seat 86 on the carrier 68. The locking mechanism 110 includes a pair of locking tangs 116 that extend upwardly from the body 106 and that correspond to the pair of pockets 100 formed on the upper back wall 92 of the carrier 68. The locking tangs 116 are complimentarily received in the pockets 100 so as to fix the saddle 70 relative to the carrier 68. Each tang 116 includes an upstanding finger 118 that may be articulated by the end user via the space provided by the release clearance 102 to disengage the saddle 70 from the carrier 68. Similarly, the body 106 includes a pair of locking tabs 122 that are designed to be cooperatively received in the apertures 94 formed in the lower front wall 96 of the carrier 68. In this way, the locking mechanism 110 of the saddle 70 facilitates the snap-fit attachment to the carrier 68.

The coupler mount 108 also includes a pair of upstanding panels 124 disposed in spaced parallel relationship with respect to one another so as to define a channel 126 therebetween. Each panel 124 includes a through-bore 128 that is aligned with respect to the other. In addition, a cross-member 130 extends between the panels. The channel 126, through-bore 128 and cross-member 130 cooperate with the coupler 72, as will be described in greater detail below. Similarly, the saddle 70 includes a central opening 132 that corresponds to the window 98 formed on the carrier 68 and is employed to accommodate rotational movement of various attachment members that cooperate with the coupler 72 to mount the windshield wiper to the arm. The central opening 132 extends between a pair of bottom surfaces 134 formed on the saddle 70 and that are received in the seat 86 of the carrier 68.

Referring to FIGS. 2, 3 and 11-17, the universal coupler assembly 66 further includes a coupler, generally indicated at 72, that is removably attached to the saddle 70. More specifically, the coupler 72 serves as an adaptive coupling to interconnect the wiper blade assembly 26 to the attachment member 32 of a wiper arm assembly 24. The present invention may be employed as part of a wiper system 22 for use with broad spectrum of vehicles produced by a diverse group of OEMs. In addition, the universal coupler assembly 66 having a coupler 72 in accordance with the present invention may be employed as a replacement part to an OEM wiper system or as a component of a wiper blade assembly replacement system.

In either event, the coupler 72 of the present invention is adapted to operatively engage the cross-member 130 located within the channel 126 of the saddle 70. To this end and with specific reference to FIGS. 11-12, the coupler 72 includes a pair of sidewalls 164 and 166 each having a nock 168 and 170, respectively, that are aligned with respect to each other. Each nock 168 and 170 has an arcuate rest 172 and 174, respectively, formed at its terminal end. The arcuate rests 172 and 174 include locking members 176 and 178, respectively, that are adapted to releasably engage the cross-member 130 of the saddle 70. In addition and as shown throughout the figures, the coupler 72 is adapted to operatively engage several different types of wiper arm attachment members 32, namely hook-type wiper arm attachment members 32A and 32B (FIGS. 14A-15B), pin-type wiper arm attachment members, and bayonet-type wiper arm attachment members.

Referring to FIGS. 14A-15B, hook-type wiper arm attachment members 32A and 32B are generally known in the related art and include a curved forward end 33A and 33B having an arcuate inner surface 35A and 35B and a terminal end 37A and 37B with an aperture 39A and 39B. The coupler 72 provides operative attachment to different styles of hook-type wiper arm attachment members 32A and 32B of varying sizes (i.e. 7 mm; 9×3; 9×4×23; 9×4×28; and 9×4×33 mm, etc.). To this end, the perimeter of each of the sidewalls 164 and 166 adjacent their respective nock 168 and 170 defines an arcuate surface 180 and 182 that acts to operatively retain at least a portion of the curved forward end 33A and 33B of a hook-type wiper arm attachment member 32A and 32B therebetween (see FIGS. 14A-15B). Those having ordinary skill in the art will appreciate that while the perimeter of the sidewalls 164 and 166 adjacent the nock 168 and 170 include an arcuate surface 180 and 182, different structure that accomplishes the same end may be employed along the perimeter of the sidewalls 164 and 166. By way of example, the perimeter of the sidewalls 164 and 166 may include an octagonal surface that operatively retains a portion of a hook-type wiper arm attachment member 32A and 32B.

Figure 13:
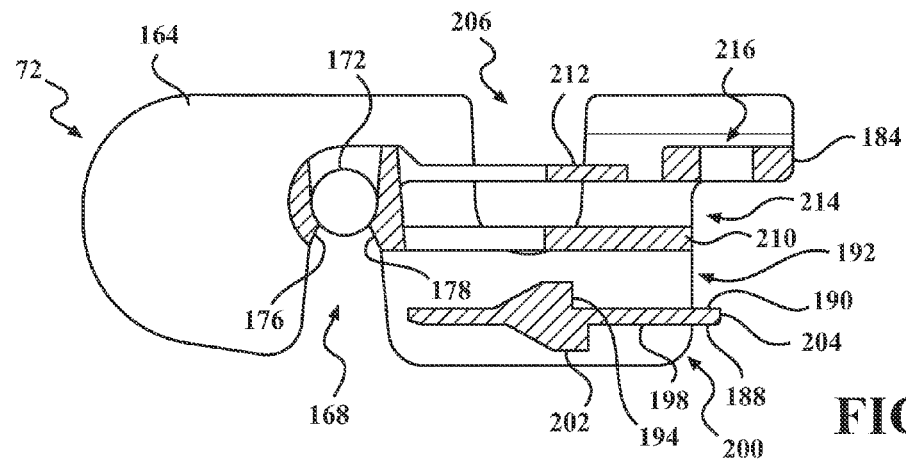
FIG. 13 is a cross-sectional side view of the coupler of the coupler assembly.
Figure 14A:
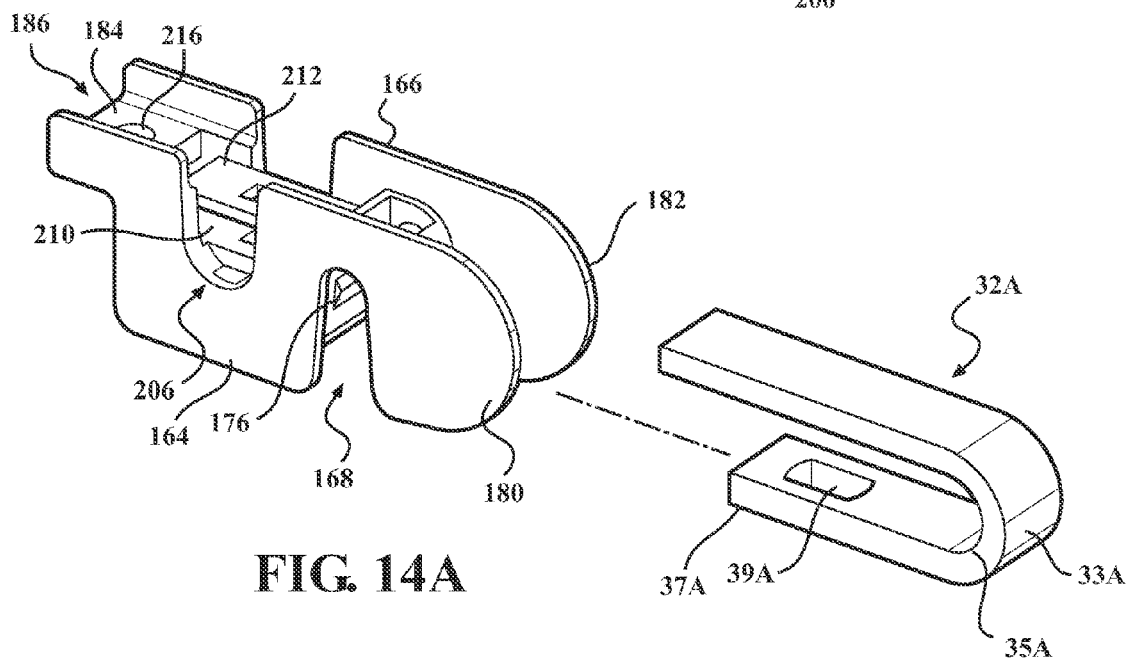
FIG. 14A is an assembly view of the coupler of the coupler assembly illustrating the contact location for a first hook-type wiper arm attachment member.
Figure 14B:
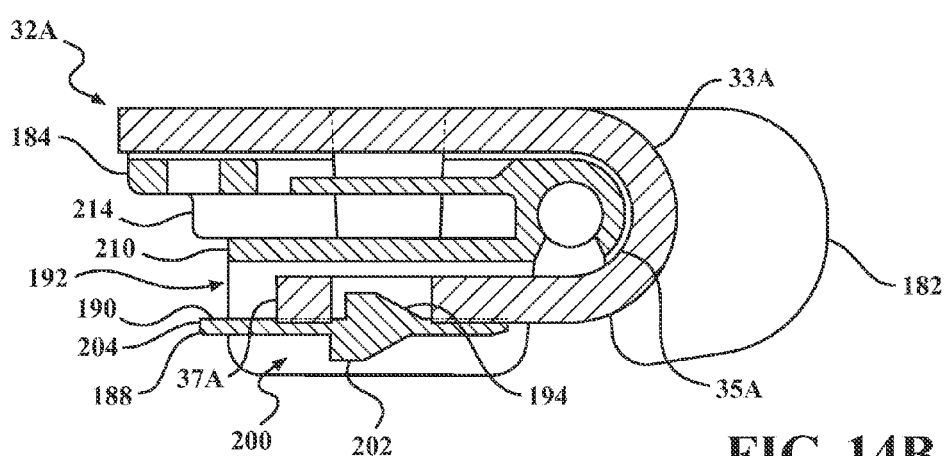
FIG. 14B is a cross-sectional side view of the coupler of the coupler assembly operatively engaged to the first hook-type wiper arm attachment member of the type illustrated in FIG. 14A.
Figure 15A:
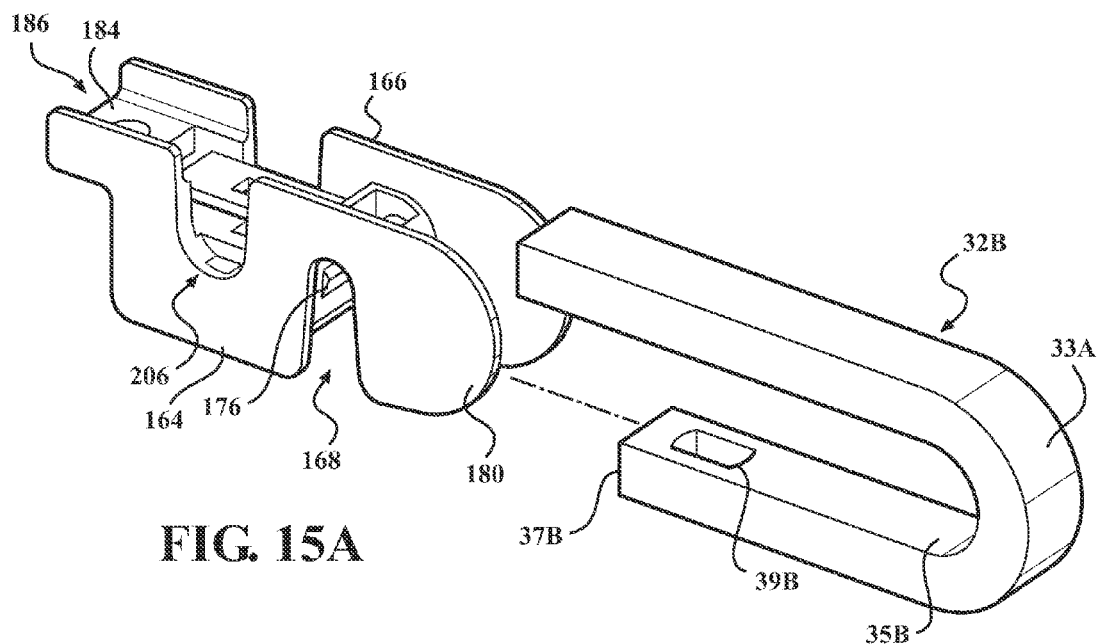
FIG. 15A is an assembly view of the coupler of the coupler assembly illustrating the contact location for a second hook-type wiper arm attachment member.
Figure 15B:
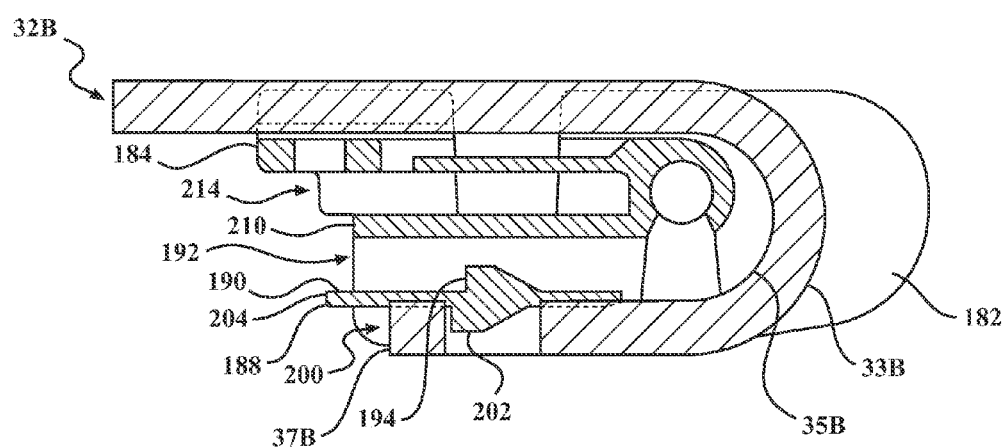
FIG. 15B is a cross-sectional side view of the coupler of the coupler assembly operatively engaged to the second hook-type wiper arm attachment member of the type illustrated in FIG. 15A.
Figure 16:
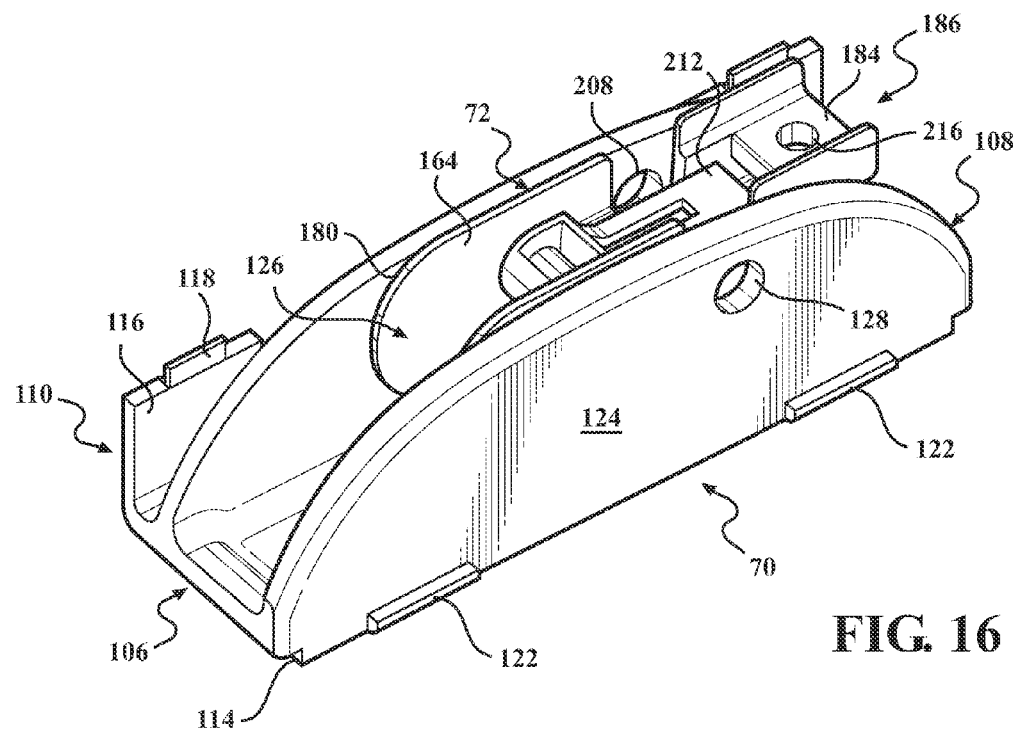
FIG. 16 is a front perspective assembly view illustrating the coupler mounted in the saddle.
Figure 17:
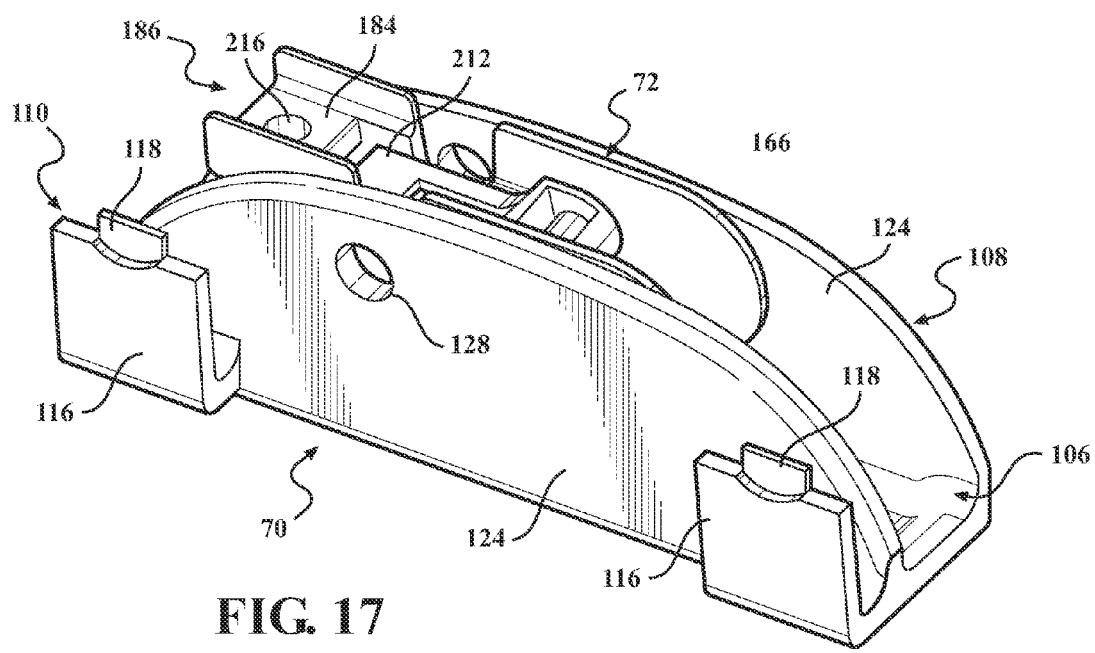
FIG. 17 is a rear perspective assembly view illustrating the coupler mounted in the saddle.

Specifically referring to FIGS. 11-13, the coupler 72 includes a land 184 extending between the sidewalls 164 and 166 that cooperates with the sidewalls 164 and 166 to define a channel 186 therebetween. The adapter 72 also includes a cantilevered beam 188 extending between the sidewalls 164 and 166 in spaced parallel relation to the land 184. The cantilevered beam 188 includes a super-surface 190 that cooperates with the sidewalls 164 and 166 to define an elongate passage 192. The super-surface 190 has a catch 194 adapted to operatively engage a first hook-type wiper arm attachment member 32A (FIG. 14B). The catch 194 extends in the direction of the land 184 and is substantially wedge-shaped to facilitate efficient "slide-over" engagement with the aperture 39A of the first hook-type wiper arm attachment member 32A. Those having ordinary skill in the art will appreciate that the catch 194 may include any shape adapted to operatively engage a first hook-type wiper arm attachment member 32A.

Referring now to FIGS. 2, 3, 11-13 and 15A and 15B, the coupler 72 of the present invention further includes structure that operatively engages a second hook-type wiper arm attachment member 32B. To this end, the cantilevered beam 188 further includes a sub-surface 198 that cooperates with the sidewalls 164 and 166 to define an elongate track 200. The sub-surface 198 has a stand 202 adapted to operatively engage a second hook-type wiper arm attachment member 32B. The channel 186 and the elongate track 200 are adapted to cooperatively receive a second hook-type wiper arm attachment member 32B of different sizes provided that the stand 202 engages the aperture 39B of the attachment member 32B. By way of example, the coupler 162 may engage a 9×4×23 hook-type wiper arm attachment member 32B. On the other hand, the coupler 162 may engage a 7 mm or 9×3 mm hook-type wiper arm attachment member 32A where the catch 194 is capable of engaging the aperture 39A.

As shown in FIG. 13, the cantilevered beam 188 further includes a terminal end 204 that facilitates releasable engagement of both a first and second hook-type wiper arm attachment member 32A and 32B. More specifically, as the first or second hook-type wiper arm attachment member 32A or 32B contacts the catch 194 or stand 202, the cantilevered beam 188 will articulate away from the attachment member 32A or 32B and subsequently return to a substantially parallel orientation relative to the attachment member 32A or 32B once the catch 194 or stand 202 operatively engages the aperture 39A or 39B. Additionally, the terminal end 204 of the cantilevered beam 188 is adapted to be contacted by the end user to release the operative engagement between a first or second attachment member 32A or 32B and the coupler 72. More specifically, the end user will engage the terminal end 204 to articulate the cantilevered beam 188 away from the attachment member 32A or 32B, thereby releasing the catch 194 or stand 202 from the aperture 39A or 39B, and simultaneously direct the coupler 72 (more generally the wiper assembly 26) away from the wiper arm attachment member 32A or 32B. Those having ordinary skill in the art will appreciate that the terminal end 204 of the cantilevered beam 188 may include a flange or bulbous end in order to more readily facilitate the end user's ability to release the wiper arm attachment member 32A or 32B from the adapter 162.

Referring to FIGS. 11-13, the coupler 72 of the present invention may operatively engage at least two different styles or sizes of pin-type wiper arm attachment member. To this end, the coupler 72 further includes a pair of notches 206 and 208 defined within the sidewalls 164 and 166 and a substrate 210 that extends between the sidewalls 164 and 166 in parallel relation to and disposed between the land 184 and the cantilevered beam 188. The substrate 210 cooperates with the land 184 and the notches 206 and 208 to operatively receive at least two different diameter pin-type wiper arm attachment members, namely ³⁄₁₆" and ¼" diameter pin-type wiper arm attachment members. More specifically, with reference to FIGS. 11-13, the land 184 has a deck 212 adapted to move in cantilevered fashion to releasably engage a pin-type wiper arm attachment member that is inserted through the a portion of the notches 206 and 208 and between the cantilevered deck 212 and the substrate 210.

With continuing reference to FIGS. 11-13, the coupler 72 is also adapted to operatively engage at least one style of a bayonet-type wiper arm attachment member. To this end, the substrate 210 cooperates with the sidewalls 164 and 166 and the land 184 to define an elongate cavity 214 to operatively receive a bayonet-type wiper attachment member. Referring specifically to FIGS. 13, 17A and 17B, the land 184 includes a port 216 disposed between the sidewalls 164 and 166 and adjacent the cantilevered deck 212. The port 216 functions to releasably engage a bayonet-type wiper arm attachment member having a nub 41. While the coupler 72 of the present invention is designed to operatively engage a bayonet-type wiper arm attachment member having a nub 41, those having ordinary skill in the art will appreciate that the coupler 72 may also operatively engage a screw-style bayonet-type wiper arm attachment member. In those instances where a screw-style bayonet-type wiper arm attachment member is employed, the port 216 will operatively receive the screw member secured to a threaded hole within the screw-style bayonet-type wiper arm attachment member.

The universal coupler assembly 66 operatively connects a wiper assembly having a beam blade-style superstructure to a wiper arm attachment member that is conventionally adapted to operatively connect a tournament-style windshield wiper assembly. Accordingly, the universal coupler assembly 66 of the present invention allows a beam blade windshield wiper assembly to serve as a replacement option to tournament-style windshield wiper assemblies, thereby increasing the availability of beam blade windshield wiper assemblies in the aftermarket.

The coupler 72 is preferably manufactured via injection molding and constructed from a polymer, such as plastic. However, the coupler 72 may alternatively be manufactured via cast molding and/or constructed from a lightweight metal, such as aluminum. Additionally, such innovative methods of manufacture and construction material may become known so as to provide a more cost-effective or otherwise preferable approach to construction and/or manufacture of the present invention than those disclosed above. Accordingly, such construction materials and methods of manufacture are within the scope of this invention.

The present invention provides a universal coupler assembly 66 having a carrier 68, saddle 70 and coupler 72 that are designed to operatively engage a plurality of different wiper arm attachment members. Accordingly, the present invention is an improvement over couplers/adapters known in the art for use in connection with beam blade windshield wiper assemblies by increasing the number wiper arm attachment members capable of attaching to a beam blade windshield wiper assembly. By increasing the number of wiper arm attachment members capable of attaching to a beam blade windshield wiper assembly, the universal coupler assembly 66 of the present invention reduces the need to manufacture several different adapters and/or replacement varieties of beam blade windshield wiper assemblies. Accordingly, the present invention provides a universal coupler assembly 66 that is mechanically efficient and cost effective to manufacture.

The universal coupler assembly 66 having a carrier 68, saddle 70 and coupler 72 of the present invention may also function as a component of a beam blade windshield wiper assembly replacement system. Accordingly, the universal coupler assembly 66 of the present invention reduces the amount of components packaged within an aftermarket beam blade windshield wiper assembly replacement systems. Further, the present invention simplifies the task of replacing a wiper blade assembly by reducing the need for multiple adapters incorporated within a single aftermarket beam blade windshield wiper assembly replacement system.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

What is claimed is:

1. A beam blade windshield wiper assembly having a universal coupler assembly, said windshield wiper assembly comprising:
    a wiping element that contacts the surface to be wiped, at least one elongated beam having a pair of longitudinal ends, and a coupler assembly;
    said coupler assembly including a carrier that is mounted to said at least one elongated beam between said longitudinal ends;
    a saddle that is removably received and retained by said carrier, wherein said carrier includes first and second ends, a front wall, a back wall disposed opposite said front wall that extends between said first and second ends of said carrier, and a top surface, a seat is formed on said top surface of said carrier, a shelf borders said seat on at least three sides thereof, and a ledge extends between two portions of said shelf along said back wall, and a pair of apertures are formed on said front wall of said carrier opposite said back wall, said seat, shelf, ledge and apertures cooperating to locate and fix said saddle relative to said carrier; and
    a coupler that is adapted to be mounted to said saddle, said coupler including a pair of sidewalls each having a notch aligned with respect to each other and a land extending between said sidewalls cooperating to define a channel therebetween;
    a cantilevered beam extending between said sidewalls in spaced parallel relation to said land, said cantilevered beam including a super-surface cooperating with said sidewalls to define an elongate passage, said channel and said elongate passage cooperating to operatively receive a first hook-type wiper arm attachment member of at least two different sizes, said cantilevered beam further including a sub-surface cooperating with said sidewalls to define an elongate track, said channel and said elongate track cooperating to operatively receive a second hook-type wiper arm attachment member of at least three different sizes; and
    a substrate extending between said sidewalls in parallel relation to and disposed between said land and said cantilevered beam, said substrate cooperating with said land and said notches to receive at least two different diameter pin-type wiper arm attachment members and further cooperating with said sidewalls and said land to define an elongate cavity adapted to operatively receive at least one style bayonet-type wiper arm attachment member.

2. A windshield wiper assembly as set forth in claim 1 wherein said super-surface further includes a catch adapted to operatively engage a first hook-type wiper arm attachment member and said sub-surface further includes a stand adapted to operatively engage a second hook-type wiper arm attachment member.

3. A windshield wiper assembly as set forth in claim 1 wherein each of said sidewalls further includes a nock aligned with respect to each other having a rest at their terminal end, said rest adapted to engage said saddle.

4. A windshield wiper assembly as set forth in claim 3 wherein said perimeter of said sidewalls adjacent said nocks define a pair of arcuate surfaces that act to operatively retain at least a portion of the curved forward end of a hook-type wiper arm attachment member therebetween.

5. A windshield wiper assembly as set forth in claim 1 wherein said land further includes a cantilevered deck adapted to move in cantilevered fashion to releasably engage a pin-type wiper arm attachment member that is inserted through said notches and between said cantilevered deck and said substrate.

6. A windshield wiper assembly as set forth in claim 5 wherein said land includes a port formed on said cantilevered deck adapted to releasably engage a bayonet-type wiper arm attachment member.

7. A windshield wiper assembly as set forth in claim 1 wherein, said windshield wiper assembly further including an airfoil assembly having two segments disposed between said first and second ends of said carrier and said longitudinal ends of said at least one beam, said two segments of said airfoil assembly having a contoured profile, said first and second ends of said carrier having a contoured exterior surface that substantially corresponds to said contoured profile of said two segments of said airfoil assembly.

8. A windshield wiper assembly as set forth in claim 7 wherein said second end of said carrier includes a relief surface that tapers downwardly toward the adjacent airfoil segment, said relief surface providing a clearance for the attachment members of the wiper arms that are serviced by the universal coupler assembly.

9. A windshield wiper assembly as set forth in claim 1 wherein said seat includes a window adapted to provide clearance for structural components of the attachment members formed on the wiper arm that are serviced by said universal coupler assembly.

10. A windshield wiper assembly as set forth in claim 9 wherein said saddle further includes a central opening that corresponds to said window formed on said carrier, said central opening and said window adapted to accommodate rotational movement of various attachment members that cooperate with said coupler to mount the windshield wiper assembly to a wiper arm.

11. A windshield wiper assembly as set forth in claim 1 wherein said saddle includes a body, a coupler mount and a locking mechanism for releasably engaging said carrier, said body adapted to be cooperatively received in said seat formed by said carrier.

12. A windshield wiper assembly as set forth in claim 11 wherein said back wall of said carrier includes a pair of pockets disposed spaced from one another, said locking mechanism cooperates with said pair of pockets formed on said back wall of said carrier to releasably mount said saddle to said carrier.

13. A windshield wiper assembly as set forth in claim 12 wherein said locking mechanism has a pair of locking tangs that extend upwardly from said body and that correspond to said pair of pockets formed on said back wall of said carrier, said locking tangs being complimentarily received in said pockets so as to fix said saddle relative to said carrier.

14. A windshield wiper assembly as set forth in claim 13 wherein each said locking tang includes an upstanding finger that may be articulated so as to provide a release clearance to disengage said saddle from said carrier.

15. A windshield wiper assembly as set forth in claim 11 wherein said body of said saddle further includes a pair of locking tabs that are adapted to be cooperatively received in said apertures formed in said front wall of said carrier, such that said locking mechanism of said saddle facilitates a snap fit attachment to said carrier.

16. A windshield wiper assembly as set forth in claim 11 wherein said coupler mount of said saddle includes a pair of upstanding panels disposed in spaced parallel relationship with respect to one another so as to define a channel therebetween, each of said panels includes a through-bore that is aligned with respect to one another, and a cross-member that extends between said panels, said channel, said through-bore and cross-member cooperating with said coupler to accommodate wiper arms having a number of different pin-type attachment members.

17. A windshield wiper assembly as set forth in claim 16 wherein said coupler is adapted to operatively engage said cross-member disposed within said channel of said saddle.

18. A windshield wiper assembly as set forth in claim 1 wherein said saddle includes a bottom wall having a pair of spaced shoulders that are adapted to cooperatively mate with said shelf that borders said seat on said carrier.

19. A beam blade windshield wiper assembly having a universal coupler assembly, said windshield wiper assembly comprising:
a wiping element that contacts the surface to be wiped, at least one elongated beam having a pair of longitudinal ends, and a coupler assembly;
said coupler assembly including a carrier that is mounted to said at least one elongated beam between said longitudinal ends, said carrier including a top surface and a seat formed on said top surface of said carrier;
a saddle that is removably received and retained in said seat of said carrier, said saddle including a body, a coupler mount and a locking mechanism for releasably engaging said carrier, said body adapted to be cooperatively received in said seat formed by said carrier, wherein said carrier includes first and second ends, a front wall, a back wall disposed opposite said front wall that extends between said first and second ends of said carrier, and a top surface, a shelf borders said seat on at least three sides thereof, a ledge extends between two portions of said shelf along said back wall, and a pair of apertures are formed on said front wall of said carrier opposite said back wall, said seat, shelf, ledge and apertures cooperating to locate and fix said saddle relative to said carrier; and
a coupler including a pair of sidewalls each having a nock aligned with respect to one another such that said coupler is adapted to be mounted to said saddle, said carrier, coupler, and saddle cooperating to accommodate at least five different sizes of hook-type attachment members, two different sizes of pin-type attachment members, and at least one size of bayonet-type attachment members.

20. A windshield wiper assembly as set forth in claim 19 wherein said back wall of said carrier includes a pair of pockets disposed spaced from one another, said locking mechanism of said saddle cooperates with said pair of pockets formed on said back wall of said carrier to releasably mount said saddle to said carrier.

21. A windshield wiper assembly as set forth in claim 20 wherein said locking mechanism has a pair of locking tangs that extend upwardly from said body and that correspond to said pair of pockets formed on said back wall of said carrier, said locking tangs being complimentarily received in said pockets so as to fix said saddle relative to said carrier.

22. A windshield wiper assembly as set forth in claim 21 wherein each said locking tang includes an upstanding finger that may be articulated so as to provide a release clearance to disengage said saddle from said carrier.

23. A windshield wiper assembly as set forth in claim 19 wherein said body of said saddle further includes a pair of locking tabs that are adapted to be cooperatively received in said apertures formed in said front wall of said carrier, such that said locking mechanism of said saddle facilitates a snap fit attachment to said carrier.

24. A windshield wiper assembly as set forth in claim 19 wherein said saddle includes a bottom wall having a pair of spaced shoulders that are adapted to cooperatively mate with said shelf that borders said seat on said carrier.

25. A windshield wiper assembly as set forth in claim 19 wherein said coupler mount of said saddle includes a pair of upstanding panels disposed in spaced parallel relationship with respect to one another so as to define a channel therebetween, each of said panels includes a through-bore that is aligned with respect to one another, and a cross-member that extends between said panels, said channel, said through-bore and cross-member cooperating with said coupler to accommodate wiper arms having a number of different pin-type attachment members.

26. A windshield wiper assembly as set forth in claim 25 wherein said nocks formed on said sidewall of said coupler are adapted to operatively engage said cross-member disposed within said channel of said saddle.

* * * * *